US006912297B2

(12) United States Patent
Scott et al.

(10) Patent No.: US 6,912,297 B2
(45) Date of Patent: Jun. 28, 2005

(54) METHOD OF DETERMINING USABILITY OF A DOCUMENT IMAGE AND AN APPARATUS THEREFOR

(75) Inventors: Dennis Scott, Camlachie (CA); Nancy B.M. Stefanuk, Waterloo (CA); Slawomir B. Wesolkowski, Kitchener (CA)

(73) Assignee: NCR Corporation, Dayton, OH (US)

( * ) Notice: Subject to any disclaimer, the term of this patent is extended or adjusted under 35 U.S.C. 154(b) by 695 days.

(21) Appl. No.: 09/835,504

(22) Filed: Apr. 16, 2001

(65) Prior Publication Data

US 2002/0150279 A1 Oct. 17, 2002

(51) Int. Cl.[7] .................................................. G06K 9/00
(52) U.S. Cl. ........................................................ 382/112
(58) Field of Search ................................ 382/112, 168, 382/199; 348/91; 358/2.1

(56) References Cited

U.S. PATENT DOCUMENTS

| 4,429,991 A | * | 2/1984 | Williams ..................... 356/73 |
| 4,623,975 A | * | 11/1986 | Kagami ..................... 356/638 |
| 5,323,473 A | * | 6/1994 | Lau ............................ 382/175 |
| 5,751,841 A | * | 5/1998 | Leong et al. ............... 382/137 |
| 6,408,094 B1 | * | 6/2002 | Mirzaoff et al. ........... 382/224 |

* cited by examiner

Primary Examiner—Andrew W. Johns
Assistant Examiner—Shervin Nakhjavan
(74) Attorney, Agent, or Firm—Michael Chan (57) ABSTRACT

A method of processing a document comprises the steps of (a) scanning a document to capture image data associated with the document, (b) processing at least a portion of the captured image data to calculate a first count of pixels associated with a corner of the document, (c) processing at least a portion of the captured image data to calculate a second count of pixels associated with the corner of the document, and (d) determining if the corner of the document is missing or has a fold based upon the first count of pixels associated with the corner of the document and the second count of pixels associated with the corner of the document. The usability of the captured image data associated with the document is determined based upon the amount of information found missing from the image of the document due to, for examples, a torn or folded corner. If the torn or folded corner is determined to be large enough, then the corresponding image of the document is determined to be unusable.

10 Claims, 10 Drawing Sheets

METHOD OF DETERMINING USABILITY OF A DOCUMENT IMAGE AND AN APPARATUS THEREFOR

BACKGROUND OF THE INVENTION

The present invention relates to quality of document images in an image-based document processing system, and is particularly directed to a method of determining usability of a document image and an apparatus therefor.

In known image-based document processing systems, such as image-based check processing systems, in which a gray scale image of a bank check is obtained from scanning the check, a binarization program is usually applied to gray scale image data representative of the gray scale image of the check to provide binary image data which is representative of a binary image of the check. Some check images, whether gray scale images or binary images, may be of such poor quality that these check images are unusable for intended purposes. Unusable check images are sometimes stored in an archive and are not identified as being unusable until they are later retrieved from the archive. When an unusable check image is later identified, there is risk that the source document from which the check image was obtained may no longer be accessible. It would be desirable to identify unusable check images before such check images are stored in an archive.

SUMMARY OF THE INVENTION

In accordance with one aspect of the present invention, a method of determining usability of a document image comprises the steps of (a) determining if a corner of a document is missing based upon captured image data associated with the document, and (b) determining if the corner of the document has a fold when the corner of the document is determined to be missing. Step (a) may include the step of (a-1) determining if at least a predetermined amount of the corner of the document is missing. Step (b) may include the step of (b-1) determining if the fold of the corner of the document is at least a predetermined size. The usability of the captured image data associated with the document is determined based upon at least one of the determinations of steps (a-1) and (b-1).

In accordance with another aspect of the present invention, a method of processing a document comprises the steps of (a) scanning a document to capture image data which is representative of an image of the document, (b) processing at least a portion of the captured image data to calculate a first count of pixels associated with a corner of the document, (c) processing at least a portion of the captured image data to calculate a second count of pixels associated with the corner of the document, and (d) determining if the corner of the document is missing or has a fold based upon the first count of pixels associated with the corner of the document and the second count of pixels associated with the corner of the document. Step (d) may include the steps of (d-1) determining whether at least a predetermined amount of the corner of the document is missing, and (d-2) determining whether the corner has a fold of at least a predetermined size when at least the predetermined amount of the corner of the document is determined to be missing. The usability of the captured image data associated with the document is determined based upon at least one of the determination as to whether at least the predetermined amount of the corner of the document is missing and the determination as to whether the corner of the document has a fold of at least the predetermined size.

In accordance with yet another aspect of the present invention, an apparatus is provided for determining usability of a document image. The apparatus comprises means for determining if a corner of the document is missing based upon captured image data associated with the document, and means for determining if the corner of the document has a fold when the corner of the document is determined to be missing. The means for determining if a corner of the document is missing may include means for determining if at least a predetermined amount of the corner of the document is missing. The means for determining if the corner of the document has a fold may include means for determining if the fold of the corner of the document is at least a predetermined size.

In accordance with still another aspect of the present invention, an apparatus comprises means for scanning a document to capture image data which is representative of an image of the document, means for processing at least a portion of the captured image data to calculate a first count of pixels associated with a corner of the document, means for processing at least a portion of the captured image data to calculate a second count of pixels associated with the corner of the document, and means for determining if the corner of the document is missing or has a fold based upon the first count of pixels associated with the corner of the document and the second count of pixels associated with the corner of the document. The means for determining if the corner of the document is missing or has a fold may include (i) means for determining whether a corner of the document is missing, and (ii) means for determining if a corner of the document has a fold when the corner of the document is determined to be missing. The means for determining whether a corner of the document is missing may include means for determining if at least a predetermined amount of the corner of the document is missing, and the means for determining if a corner of the document has a fold may include means for determining if the fold of the corner of the document is at least a predetermined size.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILS OF THE INVENTION

The present invention is directed to a method of determining usability of a document image and an apparatus therefor. The document image may be provided in an image-based document processing system such as an image-based check processing system. The document may be of any type. By way of example, a document in the form of a bank check is processed in accordance with the present invention.

Figure 1:
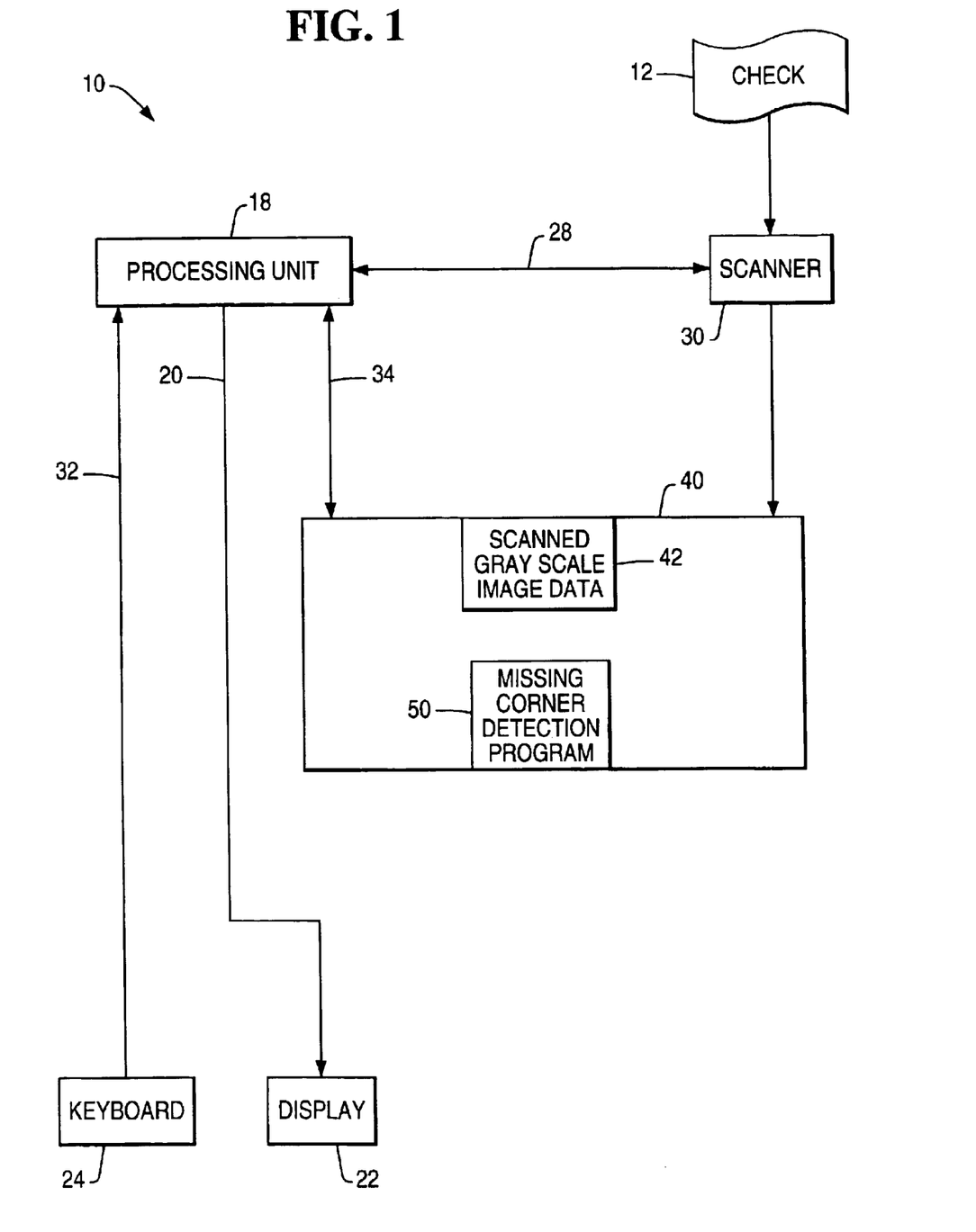
FIG. 1 is a block diagram representation of an image-based check processing system embodying the present invention.

Referring to FIG. 1, an image-based check processing system 10 includes a processing unit 18 which is electrically connected via bus line 20 to a display 22. The processing unit 18 is also electrically connected via bus line 32 to a keyboard 24 and via bus line 34 to a system memory 40. The system memory 40 includes memory space which stores, inter alia, scanned gray scale image data 42, and a number of application programs including a missing corner detection program 50 in accordance with the present invention which will be described in detail later.

The check processing system 10 further includes a scanner device 30 which is electrically connected via bus line 28 to the processing unit 18. Preferably, the processing unit 18 is a microcomputer, and the system memory 40 is a random access type of memory. Suitable microcomputers and memories are readily available in the marketplace. Their structure and operation are well known and, therefore, will not be described.

During operation, the scanner device 30 lifts an image of a bank check 12 when the check is moved past the scanner device. The scanner device 30 produces pixels each pixel having a particular gray level associated therewith. The gray level of the pixel is stored as gray scale image data 42 in the system memory 40 as shown in FIG. 1. The process of lifting an image of the check 12 and storing the image as gray scale image data 42 in system memory 40 is known and, therefore, will not be described. The gray scale image data 42 associated with all the pixels form a gray scale image of the check 12. The gray scale image of the check 12 is displayed on the display 22. The missing corner detection program 50 then processes the gray scale image data 42, as described in detail hereinbelow, to determine usability of the gray image of the check 12.

Figure 2:
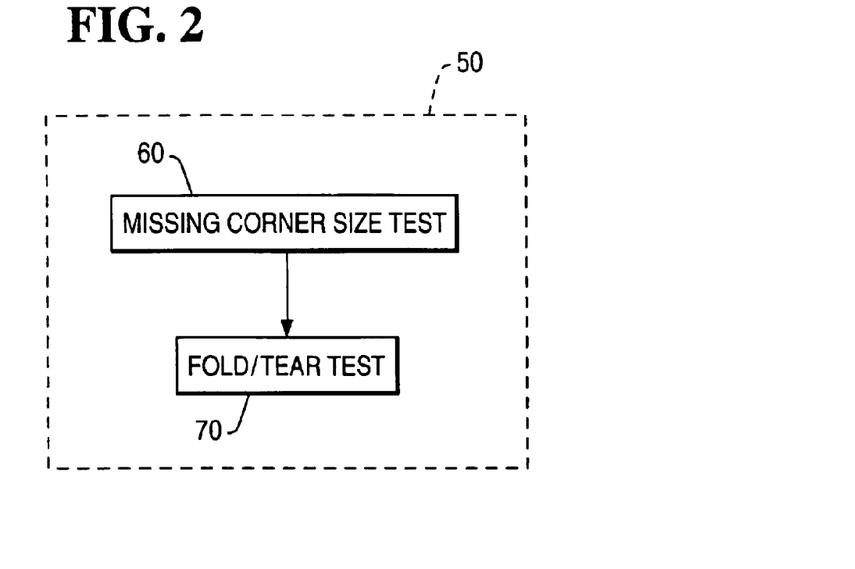
FIG. 2 is a diagram of a missing corner detection program shown in the system of FIG. 1.

Referring to FIG. 2, the missing corner detection program 50 shown in FIG. 1 includes a first subprogram 60 and a second subprogram 70. The first subprogram 60 comprises a missing corner size test, and the second subprogram 70 comprises a fold/tear test. Preferably, the missing corner size test 60 is executed before the fold/tear test 70. However, it is contemplated that the fold/tear test 70 may be executed before the missing corner size test 60.

Figure 3:
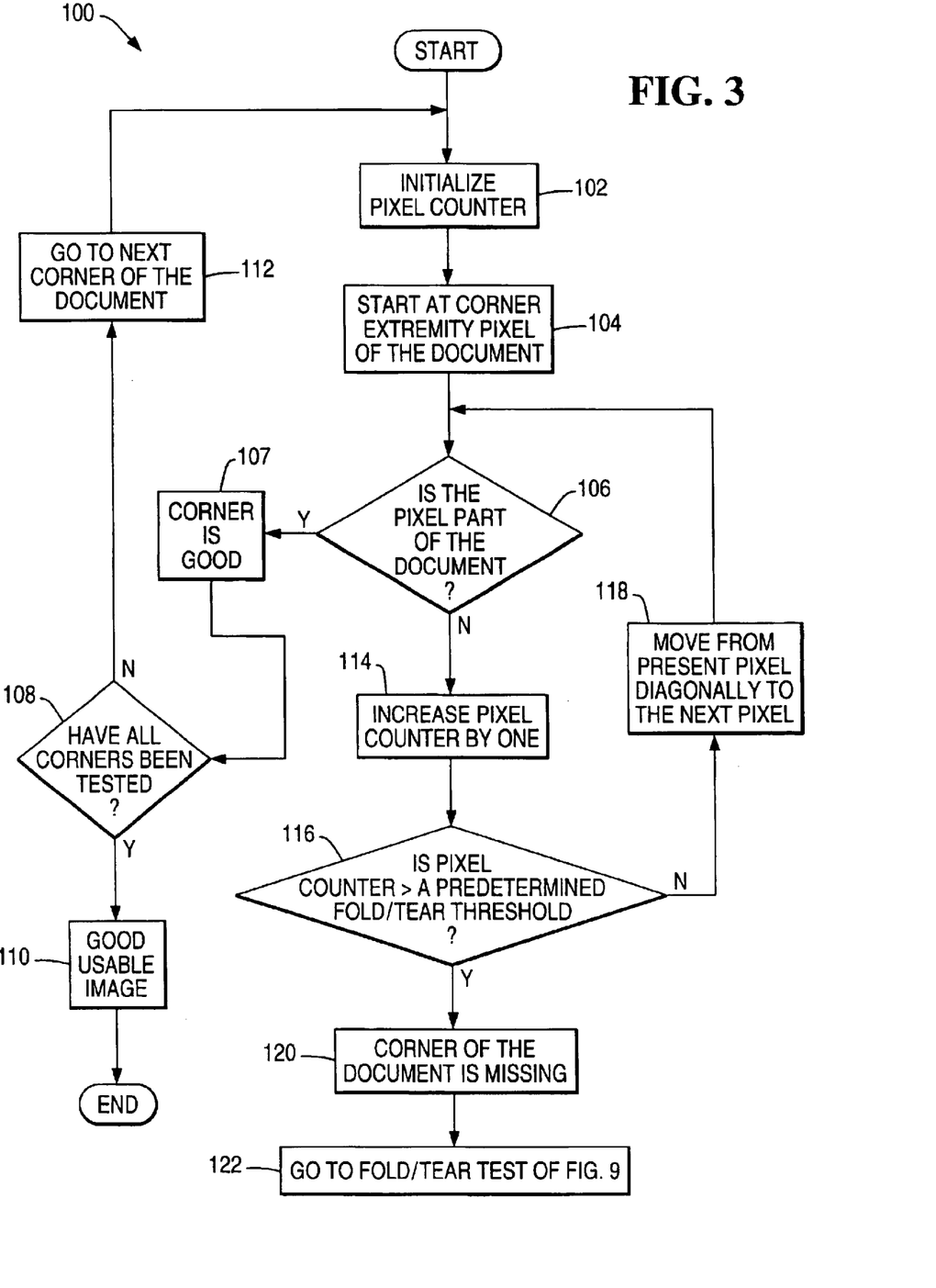
FIG. 3 is a flowchart depicting a missing corner size test which may be used in the missing corner detection program of FIG. 2 to determine if a corner of a check image is missing.

Referring to FIG. 3, a flowchart 100 depicts one form of the missing corner size test 60 which may be carried out by the missing corner detection program 50 to determine if a corner of the gray scale image of the check 12 is missing. The form of the test depicted in the flowchart 100 is referred to herein as the one-line test. By way of example, the one-line test depicted in the flowchart 100 is applied to the upper left corner of the check 12. The one-line test depicted in the flowchart 100 can be easily modified to apply to other corners of the check 12. Before the one-line test depicted in flowchart 100 is run, the gray scale image is cropped correctly both horizontally and vertically. When the image is cropped, the width of the image and the height of the image are known.

Figure 4:
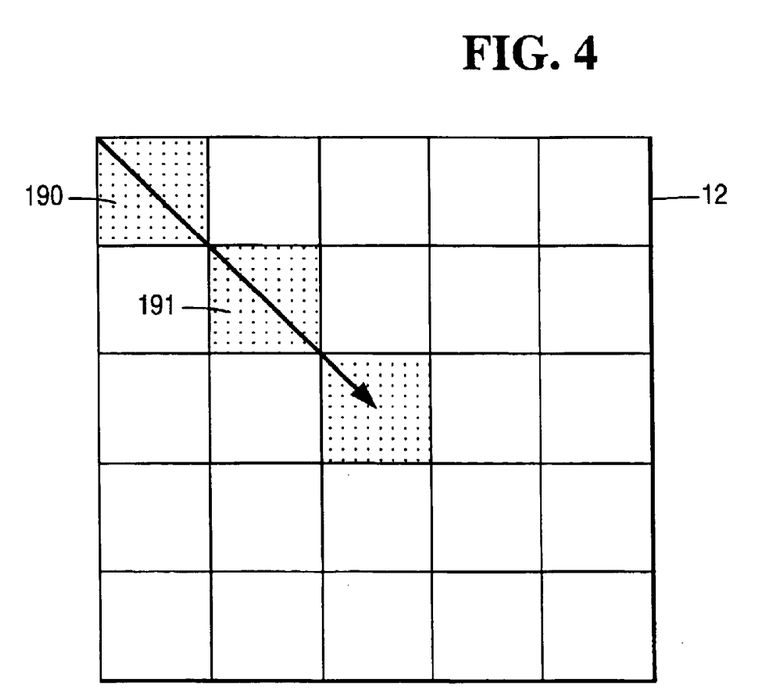
FIG. 4 is a diagram which illustrates the missing corner size test shown in the flowchart of FIG. 3.

In step 102 of the flowchart 100, a pixel counter is initialized to zero. The program proceeds to step 104 in which a pixel at the upper left corner extremity of the document (i.e., the check 12 in this instance) is examined. The pixel at the upper left corner extremity of the check 12 is shown in FIG. 4 as reference numeral 190. In step 106, a determination is made as to whether the pixel (i.e., the pixel at the upper left corner extremity in this instance) is part of the check 12. If the determination in step 106 is affirmative, then this particular corner of the check 12 is considered a good corner (as indicated in step 107) and the program proceeds to step 108 in which a determination is made as to whether all corners of the check 12 have been looked at and tested. If the determination in step 108 is affirmative, then the gray scale image data representative of the gray scale image of the check 12 is deemed to be of good enough quality to provide a good usable image, as shown in step 110. An indication of a good usable image of the check 12 is provided on the display 22. However, if the determination in step 108 is negative, the program 60 proceeds look at the next corner of the check 12, as shown in step 112, and returns back to step 102 to repeat the same previous program steps for this next corner.

However, if the determination back in step 106 is negative, the program proceeds to step 114 in which the pixel counter is incremented by a count of one before proceeding to step 116. In step 116, a determination is made as to whether the pixel counter is now greater than a predetermined fold/tear threshold. This predetermined fold/tear threshold may be set to any positive integer value. If the determination in step 116 is negative, the program proceeds to step 118 in which the next pixel which lies diagonally from the present pixel is examined. This next pixel is shown in FIG. 4 as reference numeral 191. The program returns back to step 106 to repeat the same previous program steps for this next pixel. However, if the determination back in step 116 is affirmative, the program proceeds to step 120 in which the corner of document presently under consideration is deemed to be missing. The program then proceeds to the fold/tear test 70 of FIG. 9, as shown in step 122, which will be described in detail below.

Figure 5A:
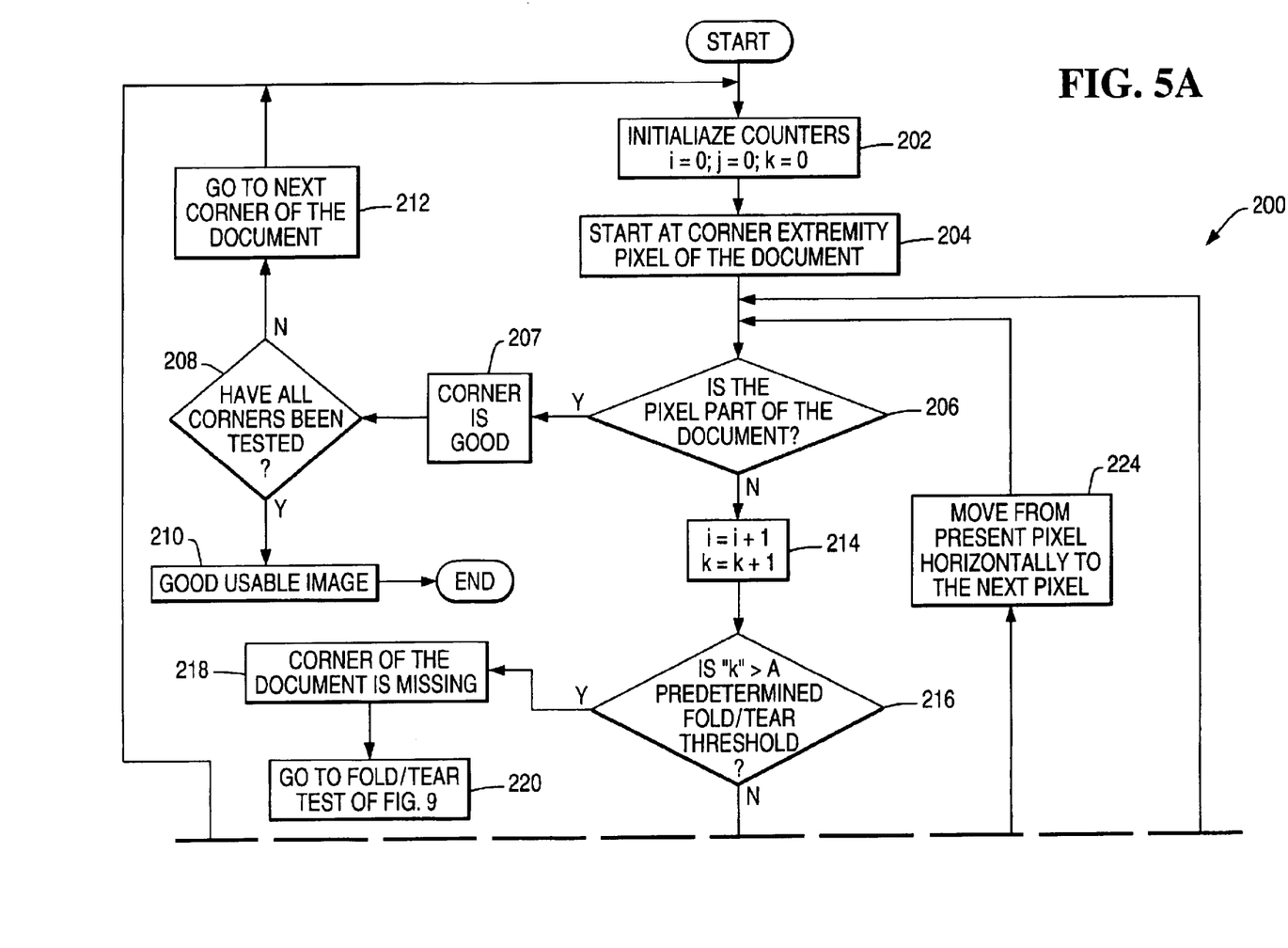
FIG. 5A–5B are flowcharts depicting another missing corner size test which may be used in the missing corner detection program of FIG. 2 to determine if a corner of a check image is missing.
Figure 5B:
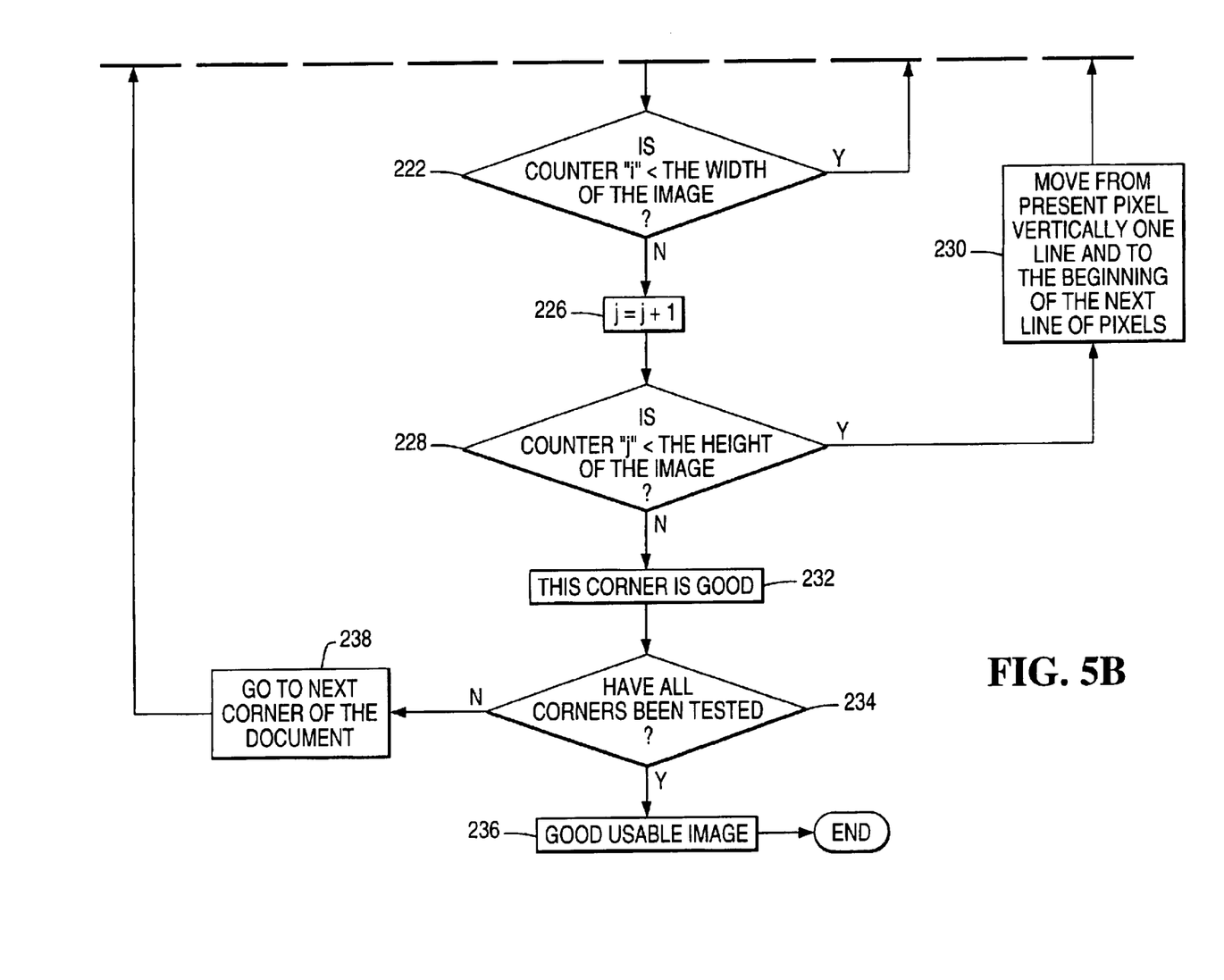

Referring to FIG. 5, a flowchart 200 depicts another form of the missing corner size test 60 which may be carried out by the missing corner detection program 50 to determine if a corner of the gray scale image of the check 12 is missing. The form of the test depicted in the flowchart 200 is referred to herein as the area test. By way of example, the area test depicted in the flowchart 200 is applied to the upper left corner of the check 12. The area depicted in the flowchart 200 can be easily modified to apply to other corners of the check 12. Before the area test depicted in flowchart 200 is run, the gray scale image is cropped correctly both horizontally and vertically. When the image is cropped, the width of the image and the height of the image are known.

Figure 6:
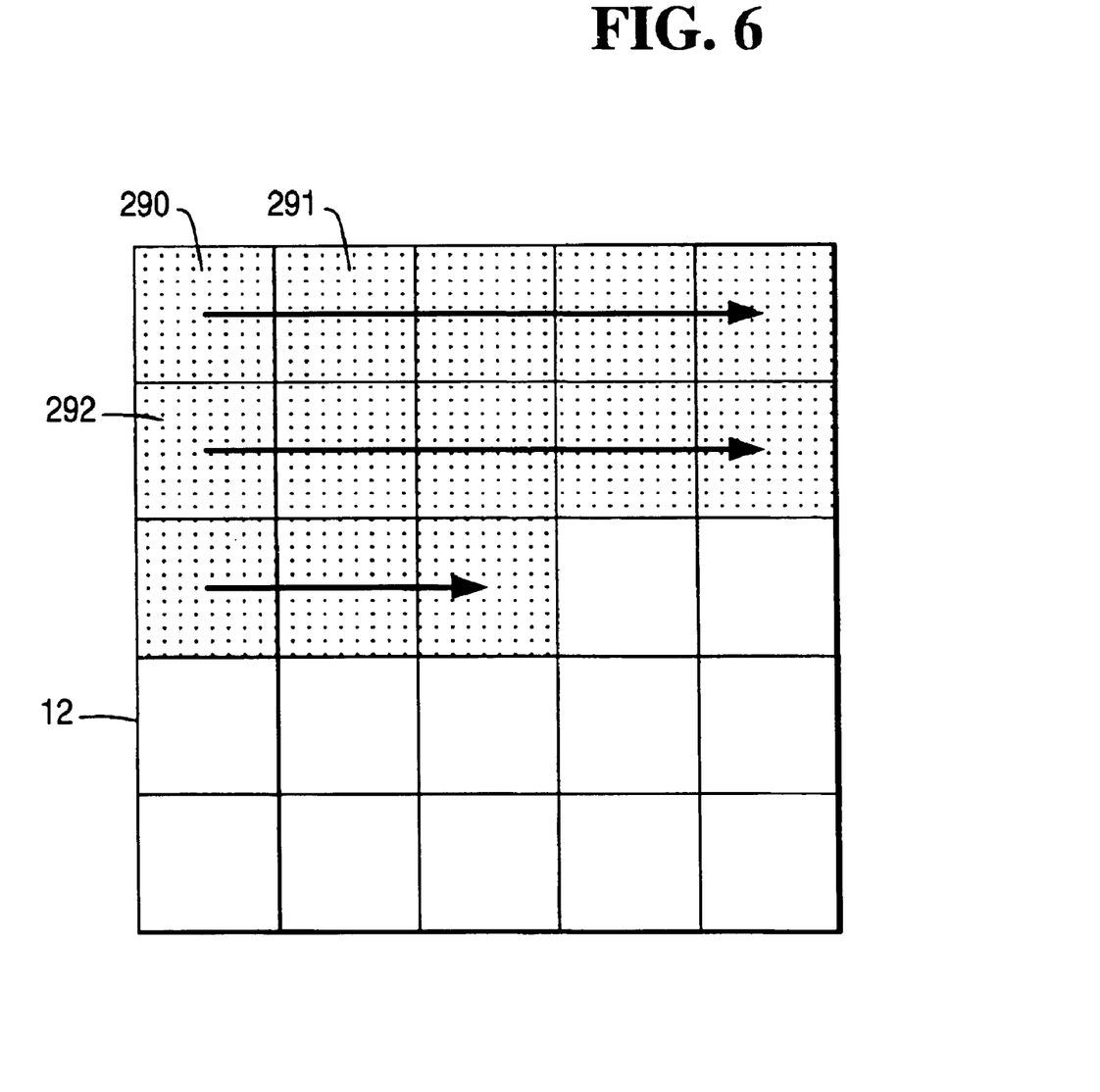
FIG. 6 is a diagram which illustrates the missing corner size test shown in the flowchart of FIG. 5.

In step 202 of the flowchart 200, three counters designated "i", "j", and "k" are initialized to zero. The program proceeds to step 204 in which a pixel at a corner extremity of the document (i.e., the check 12 in this instance) is examined. An example of a pixel at a corner extremity of the check 12 is shown in FIG. 6 as reference numeral "290". In step 206, a determination is made as to whether the pixel (i.e., the pixel at the corner extremity in this instance) is part of the check 12. If the determination in step 206 is affirmative, then this particular corner of the check 12 is considered a good corner (as indicated in step 207) and the program proceeds to step 208 in which a determination is made as to whether all corners of the check 12 have been looked at and tested. If the determination in step 208 is affirmative, then the gray scale image data representative of the gray scale image of the check 12 is deemed to be of good enough quality to provide a good usable image, as shown in step 210. An indication of a good usable image of the check 12 is provided on the display 22. However, if the determination in step 208 is negative, the program proceeds to look at the next corner of the check 12, as shown in step 212, and returns back to step 202 to repeat the same previous program steps for this next corner.

However, if the determination back in step 206 is negative, the program proceeds to step 214 in which the counter "i" is incremented by a count of one and the counter "k" is also incremented by a count of one before proceeding to step 216. In step 216, a determination is made as to whether the counter "k" is now greater than a predetermined fold/tear threshold. This predetermined fold/tear threshold may be set to any positive integer value. If the determination in step 216 is affirmative, the program proceeds to step 218 in which the corner of the check 12 presently under consideration is deemed to be missing. The program then proceeds to the fold/tear test 70 of FIG. 9, as shown in step 220, which will be described in detail below.

However, if the determination back in step 216 is negative, the program proceeds to step 222 in which a determination is made as to whether the counter "i" is less the width of the image. If the determination in step 222 is affirmative, the program proceeds to step 224 in which the next pixel which lies horizontally from the present pixel is examined. This next pixel is shown in FIG. 6 as reference numeral 291. The program returns back to step 206 to repeat the same previous program steps for this next pixel.

However, if the determination back in step 222 is negative, the program proceeds to step 226 in which the counter "j" is incremented by a count of one before proceeding to step 228. In step 228, a determination is made as to whether the counter "j" is less than the height of the image. If the determination in step is affirmative, the program proceeds to step 230 in which the next pixel which lies one line vertically and to the beginning of the next line of pixels from the present pixel is examined. This next pixel is shown in FIG. 6 as reference numeral 292. The program returns back to step 206 to repeat the same previous program steps for this next pixel.

However, if the determination back in step 228 is negative, then this corner of the check 12 is deemed to be a good corner, as shown in step 232. A determination is then made in step 234 as to whether all corners of the check 12 have been looked at and tested. If the determination in step 234 if affirmative, then the gray scale image data representative of the gray scale image of the check 12 is deemed to be of good enough quality to provide a good usable image, as shown in step 236. An indication of a good usable image of the check 12 is provided on the display 22. However, if the determination in step 234 is negative, the program proceeds to look at the next corner of the check 12, as shown in step 238, and returns back to step 202 to repeat the same previous program steps for this next corner.

Figure 7A:
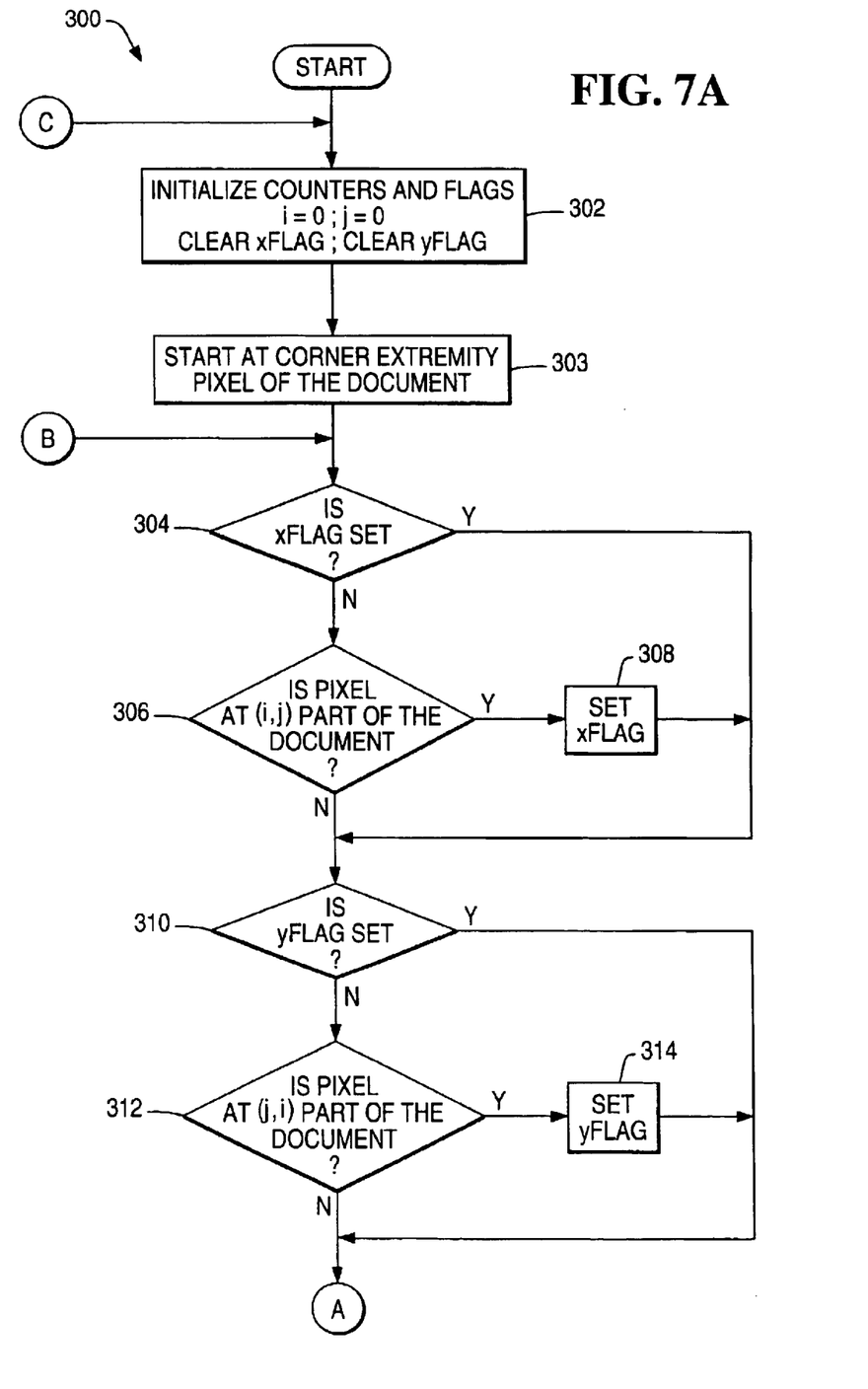
FIG. 7A–7B are flowcharts depicting still another missing corner size test which may be used in the missing corner detection program of FIG. 2 to determine if a corner of a check image is missing.
Figure 7B:
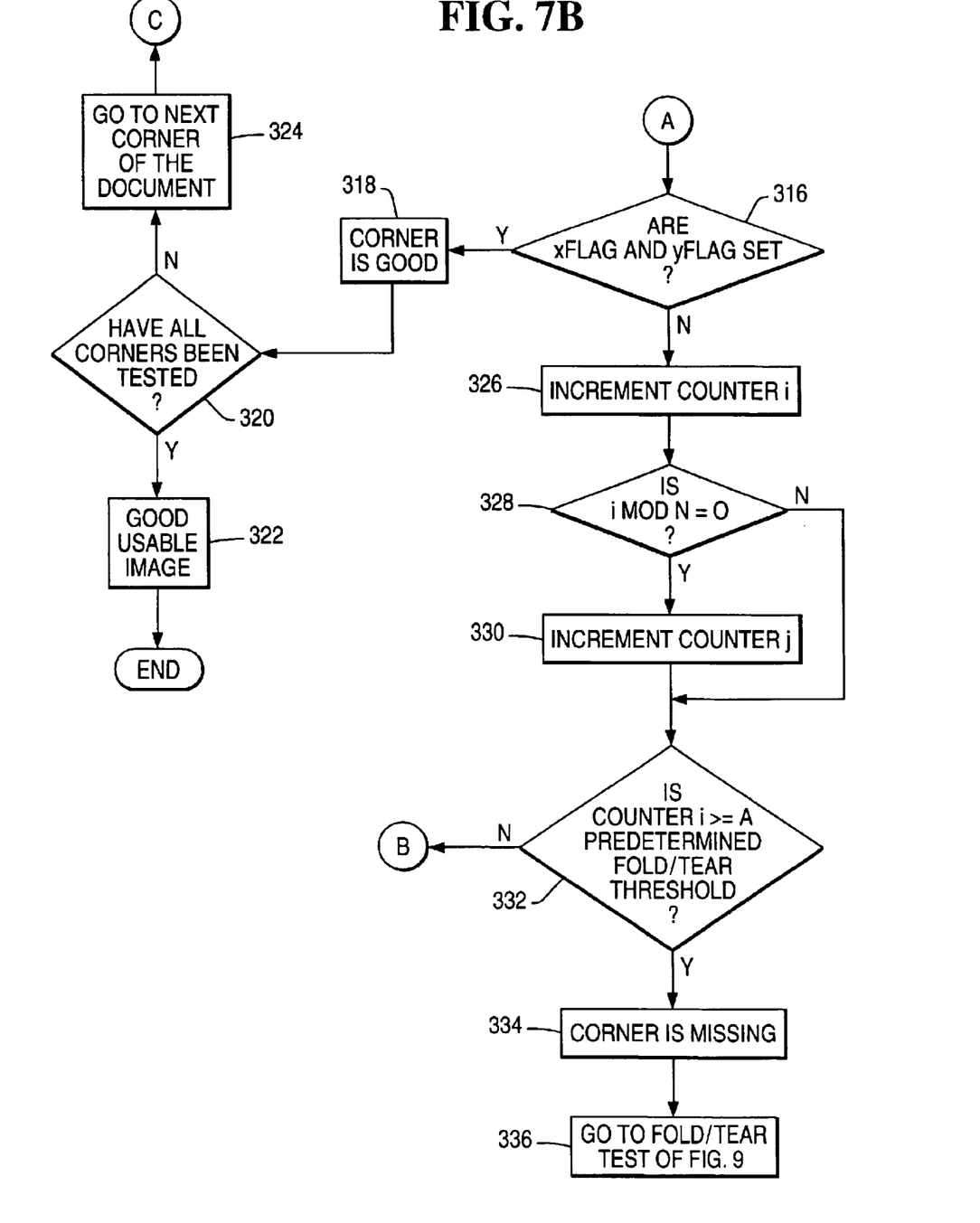

Referring to FIG. 7, a flowchart 300 depicts still another form of the missing corner size test 60 which may be carried out by the missing corner detection program 50 to determine if a missing corner of a check is either a fold or a tear. The form of the test depicted in the flowchart 300 is referred to herein as the two-line test. By way of example, the two-line test depicted in the flowchart 300 is applied to the upper left corner of the check 12. The two-test depicted in the flowchart 300 can be easily modified to apply to other corners of the check 12. Before the two-line test depicted in flowchart 300 is run, the gray scale image is cropped correctly both horizontally and vertically. When the image is cropped, the width of the image and the height of the image are known.

Figure 8:
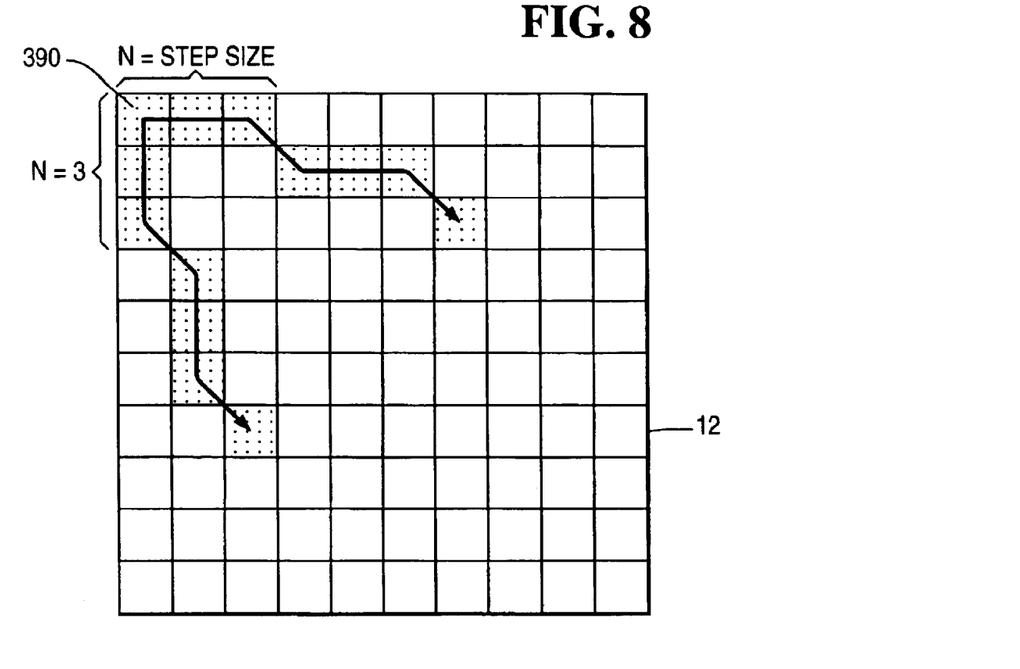
FIG. 8 is a diagram which illustrates the missing corner size test shown in the flowchart of FIG. 7.

In step 302, counters and flags are initialized. More specifically, counter "i" and counter "j" are set to zero, and flags "xFLAG" and "yFLAG" are cleared. The program proceeds to step 303 in which a pixel at the upper left corner extremity of the document (i.e., the check 12 in this instance) is examined. The pixel at the upper left corner extremity of the check 12 is shown in FIG. 8 as reference numeral 390. A determination is made in step 304 as to whether xFLAG is set. If the determination in step 304 is affirmative, the program proceeds directly to step 310. However, if the determination in step 304 is negative, the program proceeds to step 306 in which a determination is made as to whether the pixel at coordinates position (i, j) is part of the check 12. If the determination in step 306 is negative, the program proceeds to step 310. However, if the determination in step 306 is affirmative, the program proceeds to step 308 in which the xFLAG is set before proceeding to step 310.

In step 310, a determination is made as to whether the yFLAG is set. If the determination in step 310 is affirmative, the program proceeds directly to step 316. However, if the determination in step 310 is negative, the program proceeds to step 312 in which a determination is made as to whether the pixel at coordinates position (j, i) is part of the check 12. If the determination in step 312 is negative, the program proceeds to step 316. However, if the determination in step 312 is affirmative, the program proceeds to step 314 in which the yFLAG is set before proceeding to step 316.

In step 316, a determination is made as to whether both flags xFLAG and yFLAG are set. If the determination in step 316 is affirmative, then this particular corner of the check 12 is considered a good corner (as indicated in step 318) and the program proceeds to step 320 in which a determination is made as to whether all corners of the check 12 have been looked at and tested. If the determination in step 320 is affirmative, then the gray scale image data representative of the gray scale image of the check 12 is deemed to be of good enough quality to provide a good usable image, as shown in step 322. An indication of a good usable image of the check 12 is provided on the display 22. However, if the determination in step 320 is negative, the program 60 proceeds to look at the next corner of the check 12, as shown in step 324, and returns back to step 302 to repeat the same previous program steps for this next corner.

However, if the determination back in step 316 is negative, the program proceeds to step 326 in which the counter "i" is incremented by a count of one before proceeding to step 328. In step 328, a determination is made as to whether the remainder of "i" divided by "N" (which is represented mathematically as "i MOD N") is equal to zero, wherein "i" is the value of counter "i" and "N" is an integer representing the number of pixels in a row (or a column) to be considered. As shown in FIG. 8, the integer "N" is equal to three. Although the integer "N" is chosen to be three in this example, it is contemplated that "N" could have been chosen to be some other integer.

If the determination in step 328 is negative, the program proceeds directly to step 332. However, if the determination in step 328 is affirmative, the program proceeds to step 330 in which the counter "j" is incremented by a count of one before proceeding to step 332. In step 332, a determination is made as to whether the counter "i" is greater than or equal to a predetermined fold/tear threshold. If the determination in step 332 is negative, the program returns back to step 304 to repeat steps previously described. However, if the determination in step 332 is affirmative, the program proceeds to step 334 in which the corner of the check 12 presently under consideration is deemed to be missing. The program then proceeds to the fold/tear test 70 of FIG. 9, as shown in step 336, which will be described in detail.

Figure 9:
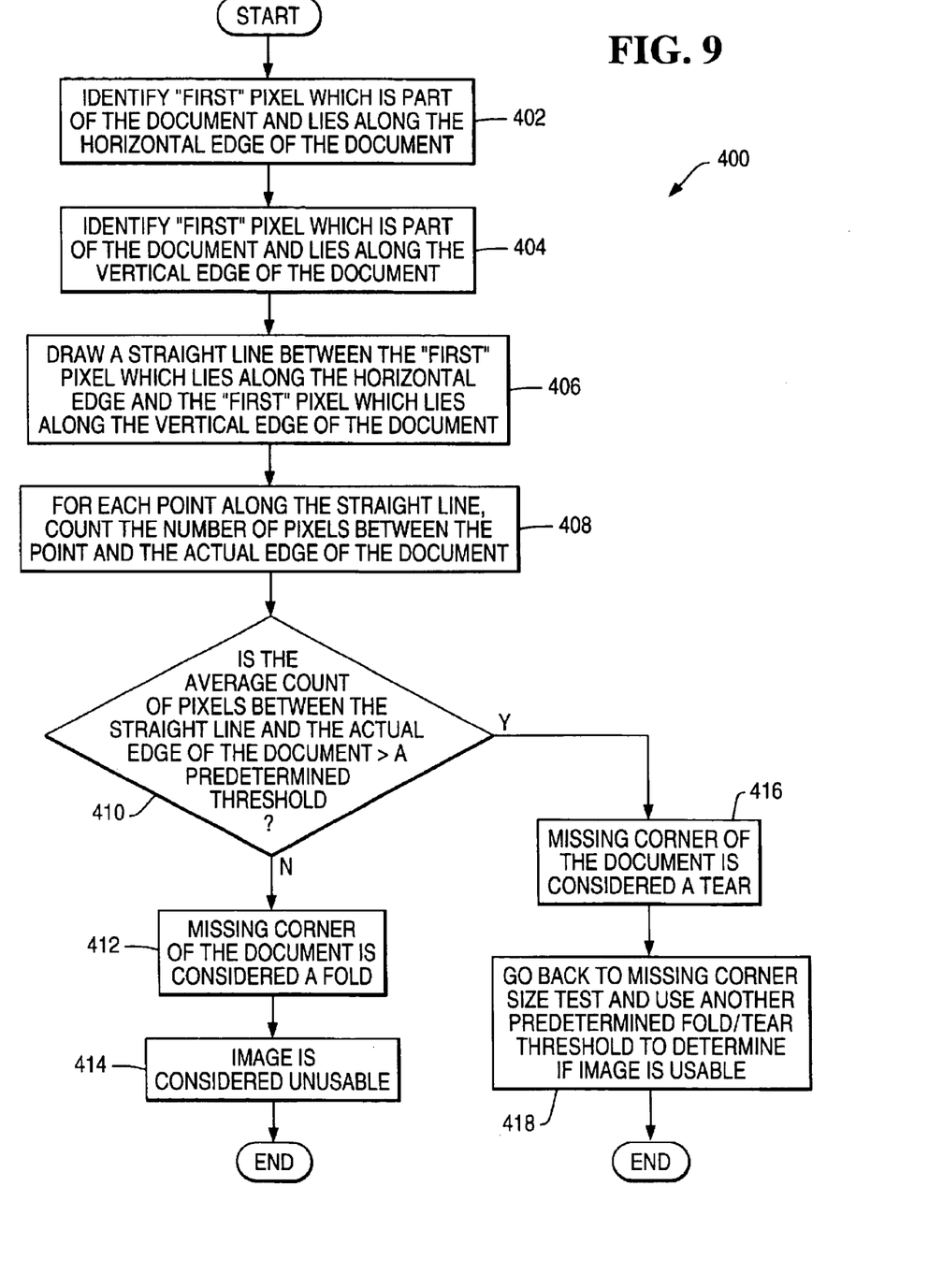
FIG. 9 is a flowchart depicting a fold/tear test which may be used in the missing corner detection program of FIG. 2 to determine if a missing corner of a document is a tear or a fold.

Referring to FIG. 9, a flowchart 400 depicts the fold/tear test 70 which may be carried out by the missing corner detection program 50 to determine if a missing corner of a check is either a fold or a tear. In step 402, a "first" pixel which is part of the check 12 and which lies along the horizontal edge of the check 12 is identified. Such a pixel is designated with reference numeral 490 in FIG. 10. Then in step 404, a "first" pixel which is part of the check 12 and which lies along the vertical edge of the check 12 is identified. Such a pixel is designated with reference numeral 491 in FIG. 10. The program proceeds to step 406 in which a straight line is drawn between the pixel 490 identified in step 402 and the pixel 491 identified in step 404. This straight line is designated with reference numeral 492 shown in FIG. 10. The program then proceeds to step 408.

Figure 10:
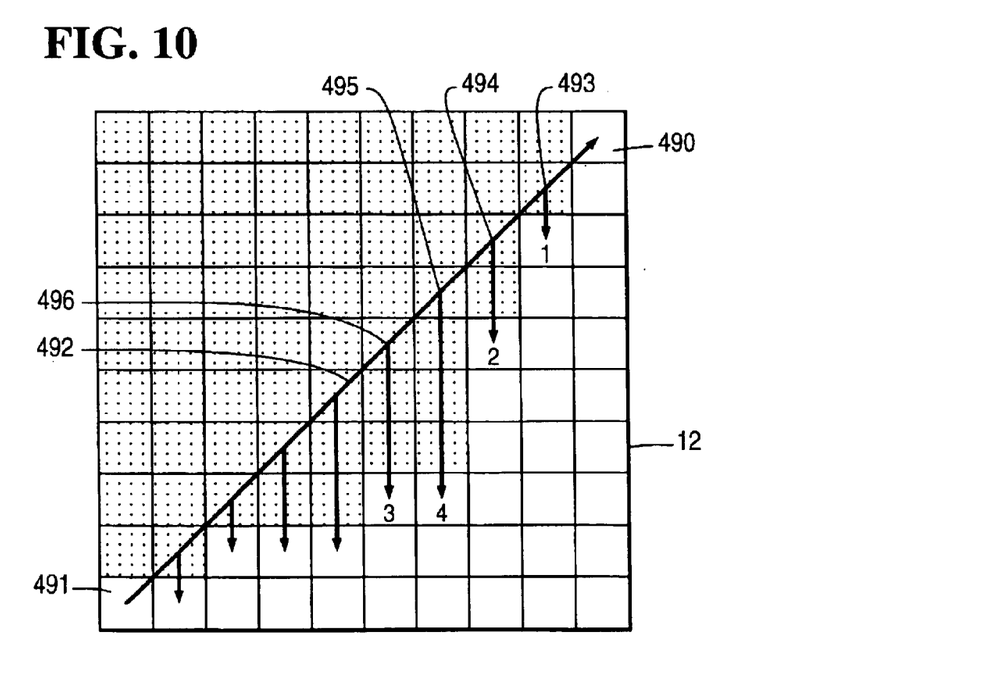
FIG. 10 is a diagram which illustrates the fold/tear test shown in the flowchart of FIG. 9.

In step 408, the number of pixels between each point along the straight line 492 and the actual edge of the check 12 is counted. For example, as shown in FIG. 10, the number of pixels between point 493 on the straight line 492 to the actual edge of the check 12 is one. Similarly, the number of pixels between point 494 on the straight line 492 to the actual edge of the check 12 is two, the number of pixels between point 495 on the straight line 492 to the actual edge of the check 12 is four, and the number of pixels between point 496 on the straight line 492 to the actual edge of the check 12 is three.

A determination is then made in step 410 as to whether the average count of the pixels between the straight line 492 and the actual edge of the check 12 is greater than a predetermined threshold. If the determination in step 410 is affirmative, the missing corner of the check 12 is deemed to be a tear, as shown in step 416. Then, as shown in step 418, the program returns to the earlier run missing corner size test 60 and is run again another predetermined fold/tear threshold to determine if the image is considered to be a good usable image. This predetermined fold/tear threshold may be the same or different from the earlier described predetermined fold/tear thresholds. However, if the determination in step 410 is negative, the missing corner of the check 12 is deemed to be a fold, as shown in step 412, and the image is considered to be unusable, as shown in step 414.

It should be apparent from the above description that the usability of captured image data associated with a document is determined based upon the amount of information found missing from the image of the document due to, for examples, a torn or folded corner. If the torn or folded corner is determined to be large enough, then the corresponding image of the document is determined to be unusable.

The above description provides three forms of the missing corner size test 60 (i.e., the one-line test, the area test, and the two-line test) and one form of the fold/tear test 70. It is contemplated that other forms of the missing corner size test 60 and/or the fold/tear test 70 may be used. It is also contemplated that the missing corner size test 60 and the fold/tear test 70 may be combined into a single program. Alternatively, either one of the programs may be broken out into a number of subprograms.

Although the above description describes the missing corner detection program 50 as being applied to a gray scale image of a check, it is contemplated that the missing corner detection program 50 may be applied to different types of images of a check, such as a color image of a check or a binary image of a check, for examples.

Also, it is contemplated that the missing corner detection program 50 may be applied to other types of image-enabled environments. For example, the missing corner detection program 50 may be applied to images in an electronic check presentment (ECP) system. In an ECP system, the missing corner detection program 50 may be applied by either the sending bank or the receiving bank to determine usability of images.

A number of advantages result by determining usability of a check image as described hereinabove. One advantage is that folded and torn corners of documents are detected quickly and with high accuracy. Another advantage is that documents with no missing corners are processed very quickly. Yet another advantage is that the missing corner detection program 50 may be tuned to different types of documents since parameters are configurable. For example, if an application has a priori knowledge of the design of documents, then parameters may be tuned to accurately determine whether a document image is usable when there is missing information.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a document, the method comprising:

scanning the document to capture digitized image data which is representative of an image of the document;

calculating a first value based upon a first image data portion which is representative of at least a portion of a corner of the document image;

calculating a second value based upon a second image data portion which is representative of at least a portion of the corner of the document image;

comparing the first calculated value with a first predetermined threshold value to determine if the corner of the document image is missing; and comparing the second calculated value with a second predetermined threshold value to determine if a missing corner of the document image is the result of a fold after the corner is determined to be missing based upon the comparison of the first calculated value with the first predetermined threshold value.

2. A method according to claim 1, further comprising:

selecting a third predetermined threshold value which is different from the first predetermined threshold value when a missing corner of the document image is unable to be determined to be the result of a fold;

comparing the first calculated value with the third predetermined threshold value to determine if a corner of the document image is missing; and comparing the second calculated value with the second predetermined threshold value to determine if a missing corner of the document image is the result of a fold after the corner is determined to be missing based upon the comparison of the first calculated value with the third predetermined threshold value.

3. A method according to claim 2, wherein the second predetermined threshold value is different from the first predetermined threshold value.

4. A method according to claim 1, further comprising:

concluding that the document image is unusable when a missing corner of the document image is determined to be the result of a fold.

5. A method of processing a document, the method comprising:

scanning a document to capture pixel data which is representative of an image of the document;

calculating a first count of pixels associated with a corner of the document image;

calculating a second count of pixels associated with the corner of the document image;

determining if the corner of the document image is missing based upon the first count of pixels associated with the corner of the document image; and if the corner in the document image is determined to be missing, determining if the missing corner is the result of a fold based upon the second count of pixels associated with the corner of the document image.

6. An apparatus comprising:

means scanning a document to capture digitized image data which is representative of an image of the document;

means for calculating a first value based upon a first image data portion which is representative of at least a portion of a corner of the document image;

means for calculating a second value based upon a second image data portion which is representative of at least a portion of the corner of the document image;

means for comparing the first calculated value with a first predetermined threshold value to determine if the corner of the document image is missing; and means for comparing the second calculated value with a second predetermined threshold value to determine if a missing corner of the document image is the result of a fold after the corner is determined to be missing based upon the comparison of the first calculated value with the first predetermined threshold value.

7. An apparatus according to claim 6, further comprising:

means for selecting a third predetermined threshold value which is different from the first predetermined threshold value when a missing corner of the document image is unable to be determined to be the result of a fold;

means for comparing the first calculated value with the third predetermined threshold value to determine if a corner of the document image is missing; and means for comparing the second calculated value with the second predetermined threshold value to determine if a missing corner of the document image is the result of a fold after the corner is determined to be missing based upon the comparison of the first calculated value with the third predetermined threshold value.

8. An apparatus according to claim 7, wherein the second predetermined threshold value is different from the first predetermined threshold value.

9. An apparatus according to claim 6, further comprising:

means for concluding that the document image is unusable when a missing corner of the document image is determined to be the result of a fold.

10. An apparatus comprising:

means for scanning a document to capture pixel data which is representative of an image of the document;

means for calculating a first count of pixels associated with a corner of the document image;

means for calculating a second count of pixels associated with the corner of the document image;

means for determining if the corner of the document image is missing based upon the first count of pixels associated with the corner of the document image; and means for, if the corner in the document image is determined to be missing, determining if the missing corner is the result of a fold based upon the second count of pixels associated with the corner of the document image.

* * * * *